(12) United States Patent
Saida et al.

(10) Patent No.: US 7,242,453 B2
(45) Date of Patent: Jul. 10, 2007

(54) LIQUID CRYSTAL DISPLAY DEVICE WITH SCATTERING FIBER

(75) Inventors: Shinsuke Saida, Tenri (JP); Noriko Watanabe, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 166 days.

(21) Appl. No.: 10/784,617

(22) Filed: Feb. 23, 2004

(65) Prior Publication Data

US 2004/0165125 A1 Aug. 26, 2004

(30) Foreign Application Priority Data

Feb. 25, 2003 (JP) ............... 2003-047426
Jan. 28, 2004 (JP) ............... 2004-020119

(51) Int. Cl.
G02F 1/1333 (2006.01)
G02F 1/1335 (2006.01)

(52) U.S. Cl. ............... 349/159; 349/96; 349/112; 349/158

(58) Field of Classification Search ............... 349/158, 349/96, 112, 159
See application file for complete search history.

(56) References Cited

U.S. PATENT DOCUMENTS 5,506,706 A 4/1996 Yamahara et al.
5,771,039 A * 6/1998 Ditzik ............... 345/178
6,424,395 B1 * 7/2002 Sato et al. ............... 349/112
6,569,502 B1 * 5/2003 Ito et al. ............... 428/1.1
2005/0083463 A1 * 4/2005 Sakai et al. ............... 349/118
2006/0154041 A1 * 7/2006 Hashimoto et al. ............... 428/297.4

FOREIGN PATENT DOCUMENTS

| JP | 59-033428 | 2/1984 |
| JP | 60-078420 | 5/1985 |
| JP | 11-002812 | 1/1999 |
| JP | 2001-133761 | 5/2001 |

* cited by examiner

Primary Examiner—Andrew Schechter
Assistant Examiner—Hoan C. Nguyen
(74) Attorney, Agent, or Firm—Keating & Bennett, LLP

(57) ABSTRACT

A liquid crystal display device includes a liquid crystal layer, a first substrate located closer to a viewer than the liquid crystal layer is, a second substrate arranged so as to face the first substrate with the liquid crystal layer interposed between them, and a first polarizer provided even closer to the viewer than the first substrate is. The first substrate includes a first plastic substrate on which a plurality of fibers is aligned in a first direction. The first polarizer is arranged such that the transmission axis of the first polarizer is either substantially parallel to, or substantially perpendicular to, the first direction.

7 Claims, 4 Drawing Sheets

11(11A)

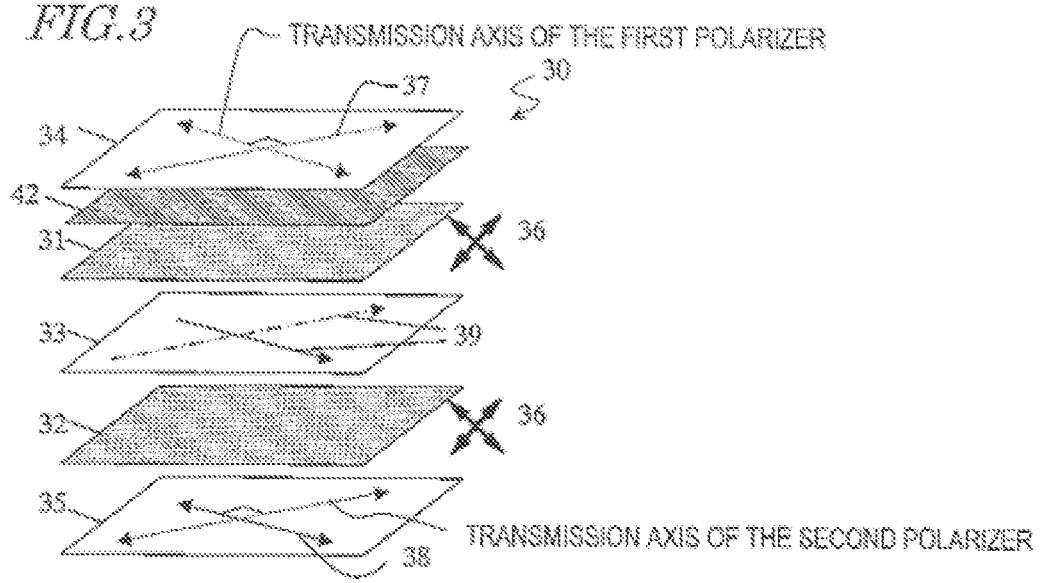
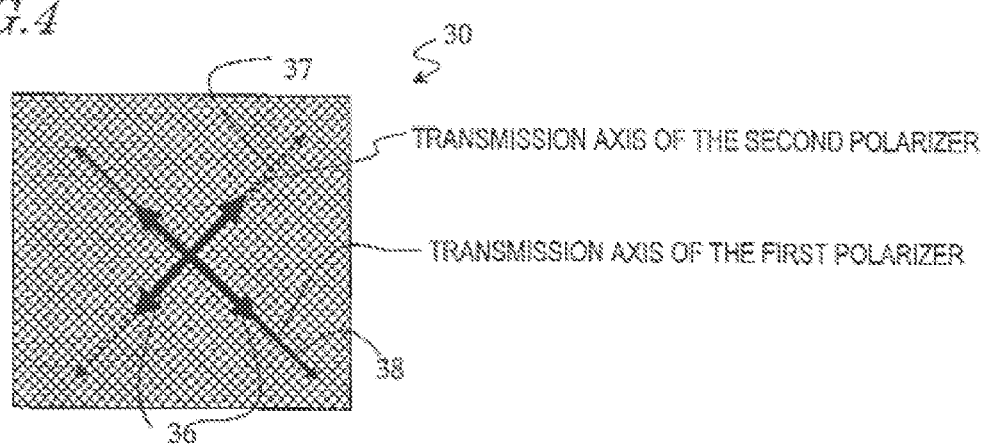

LIQUID CRYSTAL DISPLAY DEVICE WITH SCATTERING FIBER

This non-provisional application claims priority under 35 USC § 119(a) on Patent Applications No. 2003-47426 filed in Japan on Feb. 25, 2003 and No. 2004-20119 filed in Japan on Jan. 28, 2004, the entire contents of which are hereby incorporated by reference.

BACKGROUND OF THE INVENTION

1. Field of the Invention

The present invention relates to a liquid crystal display device and more particularly relates to a liquid crystal display device including a fiber-filled plastic substrate.

2. Description of the Related Art

Recently, liquid crystal displays (LCDs) have found broader and broader applications. Among other things, LCDs can be used more and more extensively in mobile telecommunications apparatuses such as cell phones and personal digital assistants (PDAs) because LCDs are thin and lightweight and dissipate much less power than other display devices. In addition, in order to use LCDs even more effectively, it has become increasingly necessary to further reduce their weight and thickness and further improve their shock resistance.

To achieve these objects, some people proposed that the conventional glass substrate of LCDs be replaced with a plastic substrate. However, in order to use a plastic substrate, or a sheet of a resin material, as a substrate for an LCD effectively, there are still a number of obstacles that must be overcome.

One of the biggest problems is the high coefficient of linear thermal expansion of a plastic substrate. Specifically, the coefficient of linear thermal expansion of glass is normally a matter of several ppm/° C., whereas that of a plastic is at least several tens of ppm/° C. If the material has that a high of a coefficient of linear thermal expansion, then the size of the material varies to a significant degree according to the temperature. Accordingly, it is difficult to form TFTs or other driver components on such an easily expandable substrate because TFTs need to be patterned with high precision. Also, even if a conventional glass substrate is used as the substrate to mount the TFTs (which will be sometimes referred to herein as a "TFT substrate" simply) and if a plastic substrate is used as its counter substrate, it is still difficult to align color filters (and/or black matrix) on the counter substrate with pixel electrodes on the TFT substrate.

To make the size of a plastic substrate much less variable by reducing the coefficient of linear thermal expansion thereof, a method of making a plastic substrate of a composite material, obtained by mixing a filler with a resin matrix, was also proposed. A substrate made of such a composite material will be referred to herein as a "composite substrate". For example, Japanese Laid-Open Publication No. 11-2812 discloses a reflective conductive substrate including a composite substrate that is formed by impregnating a piece of glass fiber fabric with a resin and curing the resin.

On the other hand, Japanese Laid-Open Publication No. 2001-133761 discloses a plastic substrate including a composite substrate that is formed by arranging linear or striped fibers in a resin so that the fibers do not contact each other. According to Japanese Laid-Open Publication No. 2001-133761, if the composite substrate is formed by filling a fiber fabric (or woven fabric) with a resin as disclosed in Japanese Laid-Open Publication No. 11-2812, then fine unevenness will be created on the surface of the substrate by the woven and overlapped portions of the fiber fabric, thus possibly deteriorating the display quality. However, Japanese Laid-Open Publication No. 2001-133761 insists that a composite substrate with a flat surface can be obtained by arranging those fibers in a resin in that manner.

However, the present inventors analyzed the optical properties of such a composite substrate, obtained by filling a resin matrix with fibers, from various angles. As a result, the present inventors discovered that some leakage of light was observed in an LCD including the conventional composite substrate. The present inventors also discovered that such leakage of light occurred due to the refractive index anisotropy of the composite substrate and depended on the positional relationship between the transmission axis (or polarization axis) of its polarizer and the composite substrate.

That is to say, even if the unevenness formed by the woven or overlapped portions of the fibers is eliminated as disclosed in Japanese Laid-Open Publication No. 2001-133761, the display quality may still deteriorate due to the refractive index anisotropy of the composite substrate. Japanese Laid-Open Publication No. 2001-133761 does mention the refractive index distribution but is silent about the refractive index anisotropy (i.e., phase difference or retardation) and its distribution. Thus, Japanese Laid-Open Publication No. 2001-133761 failed to recognize the refractive index anisotropy of the fiber-filled composite substrate.

Meanwhile, Japanese Laid-Open Publications No. 59-33428 and No. 60-78420, for example, describe preferred arrangements of the optic axis (i.e., the axis of optical anisotropy) of a plastic substrate made of a resin material only.

Specifically, Japanese Laid-Open Publication No. 59-33428 describes that if a biaxially rolled crystalline plastic substrate (film) is used, the color unevenness resulting from the birefringence of the plastic substrate can be eliminated by arranging the axis of optical anisotropy of the plastic substrate perpendicularly to the transmission axis (or polarization axis) of the polarizer.

On the other hand, Japanese Laid-Open Publication No. 60-78420 describes that the display quality can be improved by decreasing the angle defined between the optic axis and the rubbing direction to less than 45 degrees according to the magnitude of the retardation of the plastic substrate. Japanese Laid-Open Publication No. 60-78420 also describes that if the plastic substrate has a retardation of 15 nm or less, the angle between the optic axis and the rubbing direction may be defined at random.

However, the present inventors analyzed the optical anisotropy of those composite substrates in detail to discover that even when the optic axis of the plastic substrate was defined as disclosed in Japanese Laid-Open Publication No. 59-33428 or 60-78420, the leakage of light still could not be minimized and the display quality (e.g., the front contrast ratio among other things) could not be improved.

SUMMARY OF THE INVENTION

In order to overcome the problems described above, preferred embodiments of the present invention significantly improve the display quality of a liquid crystal display device including a fiber-filled plastic substrate.

A liquid crystal display device according to a preferred embodiment of the present invention includes a liquid crystal layer, a first substrate which is provided closer to a viewer than the liquid crystal layer is, a second substrate which is arranged so as to face the first substrate with the liquid crystal layer interposed between the first and second substrates, and a first polarizer which is provided even closer to the viewer than the first substrate is. The first substrate includes a first plastic substrate on which a plurality of fibers are aligned in a first direction. The first polarizer is aligned such that the transmission axis of the first polarizer is either substantially parallel to, or substantially perpendicular to, the first direction.

In one preferred embodiment of the present invention, the first plastic substrate preferably also includes another plurality of fibers that are aligned in a second direction intersecting with the first direction.

In this particular preferred embodiment, the first and second directions preferably intersect each other substantially at right angles.

In another preferred embodiment, the first plastic substrate preferably has an in-plane retardation and is preferably aligned such that a direction in which the refractive index thereof becomes the highest within a plane of the substrate defines an angle of less than 45 degrees with respect to the transmission axis of the first polarizer.

In an alternative preferred embodiment, the first plastic substrate has no in-plane retardations.

In still another preferred embodiment, a first alignment film, subjected to a rubbing treatment, is preferably arranged on the first substrate so as to face the liquid crystal layer, and the rubbing direction of the first alignment film is preferably defined so as to be either substantially parallel to, or substantially perpendicular to, the first direction.

In yet another preferred embodiment, the liquid crystal layer is preferably a TN liquid crystal layer. The device preferably further includes a second polarizer which is arranged on the second substrate such that the second substrate is sandwiched between the liquid crystal layer and the second polarizer, and at least one phase plate which is provided between the first substrate and the liquid crystal layer and/or between the second substrate and the liquid crystal layer. The first and second polarizers are preferably arranged such that the transmission axes thereof are either substantially perpendicular to, or substantially parallel to, each other. If the index ellipsoid of the at least one phase plate has an a-axis, a b-axis and a c-axis as principal axes that cross each other at right angles and if principal refractive indices on the a-axis, b-axis and c-axis are na, nb and nc, respectively, then na=nb>nc is preferably satisfied, the a-axis is located within the plane of the at least one phase plate, and the c-axis defines a tilt angle θ within a bc plane with respect to a line that is perpendicular to the phase plate. The at least one phase plate is preferably arranged such that the c-axis thereof is substantially parallel to the absorption axis (i.e., substantially perpendicular to the transmission axis) of the first or second polarizer that is provided on the same side of the liquid crystal layer as the at least one phase plate.

A liquid crystal display device according to a preferred embodiment of the present invention may be a transmissive LCD, a reflective LCD, or even a transflective (semitransmissive) LCD. If the present invention is applied to either a transmissive LCD or a transflective LCD, the second substrate may be substantially the same plastic substrate as the first plastic substrate.

According to preferred embodiments of the present invention, the leakage of light, resulting from the refractive index anisotropy caused by fibers (or bundles of fibers) in microscopic areas, can be minimized. Thus, the display quality of a liquid crystal display device including a fiber-filled plastic substrate can be improved particularly in terms of its front contrast ratio.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3 schematically illustrates a configuration for a liquid crystal display device 30 according to a preferred embodiment of the present invention.

FIG. 4 schematically shows the arrangements of optic axes in the liquid crystal display device 30.

DETAILED DESCRIPTION OF PREFERRED EMBODIMENTS

The present inventors carried out extensive research on the refractive index anisotropy of a fiber-filled composite substrate that resulted in the following discoveries, which formed the basis of the present invention.

First, the refractive index anisotropy of a fiber-filled composite substrate will be described in detail. In the following example, a composite substrate in which multiple bundles of fibers are aligned so as to cross each other substantially at right angles will be described. In a fiber-filled composite substrate, fibers are preferably aligned in two directions such that intersect with each other substantially at right angles (one of the two directions that the major axis of the fibers face will be sometimes referred to herein as "alignment direction"). This is because various physical properties (including mechanical and thermal properties) of the substrate can be made isotropic in terms of the coefficient of linear thermal expansion, for example. Also, those fibers that are aligned in two substantially perpendicular directions preferably make up a woven fabric. If a woven fabric is used, the mechanical strength can be increased more effectively than using a nonwoven fabric. In the following example, a plane woven fabric is preferably used. A plane woven fabric is preferred because the variation in the thickness of the composite substrate (i.e., the unevenness of its surface) can be reduced as compared with a satin woven fabric or a twill woven fabric. That is to say, the level difference created by overlapping the fibers can be much lower in the plane woven fabric than in the satin or twill woven fabric.

Figure 1A:
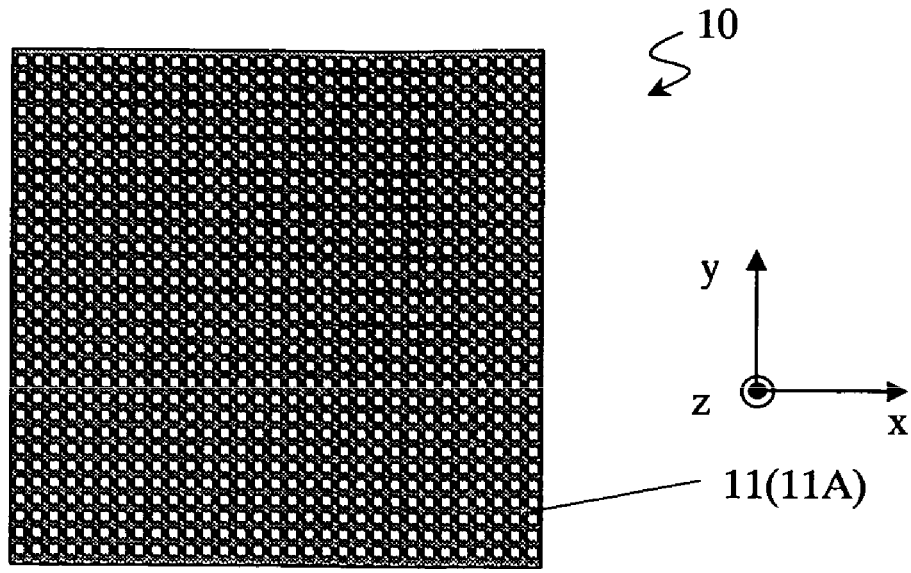
FIGS. 1A and 1B are respectively a plan view and a perspective view schematically illustrating a configuration for a plastic substrate for use in a liquid crystal display device according to a preferred embodiment of the present invention.
Figure 1B:
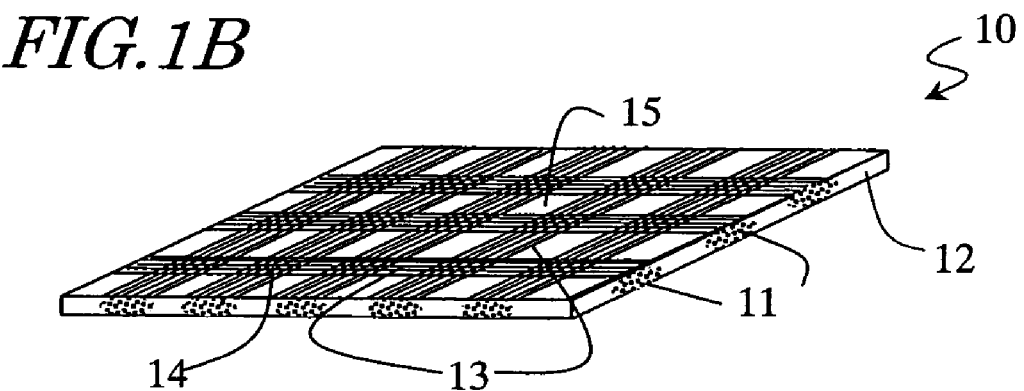

The plastic substrate 10 shown in FIGS. 1A and 1B is a composite substrate 10 including fiber bundles 11 and a resin matrix 12. If necessary, the principal surface of the composite substrate 10 may be covered with a protective coating (e.g., a hard coating). In the example illustrated in FIGS. 1A and 1B, the plastic substrate includes no protective coating and therefore is identified by the same reference numeral 10 as the composite substrate.

Figure 1C:
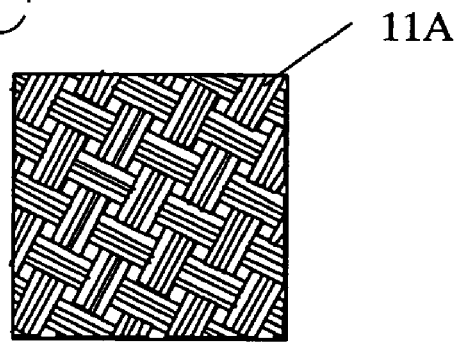
FIG. 1C is a plan view schematically illustrating a plane woven fabric to be included in the plastic substrate.

The fiber bundles 11 are aligned in two substantially perpendicular directions within a substrate plane (e.g., in x-axis direction and y-axis direction in this case). Thus, the composite substrate 10 is a plane woven fabric as schematically illustrated in FIG. 1C. The same type of fibers are included at the same density in each and every bundle 11. For example, the width of each fiber bundle 11 may be about 200 μm and the pitch between two adjacent fiber bundles 11 may be about 500 μm in both the x- and y-axis directions. Each of the fibers making up each bundle 11 may have a diameter of about 10 μm, for example.

The refractive index anisotropy of this composite substrate 10 may be measured by a normal method (e.g., on a 10 mm square area). Then, within a plane of the composite substrate 10, a direction in which the refractive index becomes the highest is located between the x-axis and the y-axis (but is shifted from the direction that defines an angle of about 45 degrees with respect to the x-axis and the y-axis). This is believed to be because even if the woven fabric is made up of the same fiber bundles 11 that are aligned at the same pitch in the x-axis and y-axis directions, these two directions still cannot be quite equivalent to each other.

The composite substrate 10 to used as a transparent substrate for an liquid crystal display device preferably has as high a transmittance to visible radiation as (i.e., is as transparent as) a conventional glass substrate and yet preferably has no birefringence. Accordingly, the materials of the fiber bundles 11 and resin matrix 12, making up this composite substrate 10, are preferably transparent to visible radiation, preferably have substantially equal refractive indices, and preferably have no birefringence. Even so (i.e., even if the fiber bundles 11 and resin matrix 12 are made of transparent materials with almost equal refractive indices and no birefringence), the resultant composite substrate 10 still should have some birefringence (i.e., refractive index anisotropy) due to the thermal hysteresis of the manufacturing process of the composite substrate 10. The reasons are believed to be as follows. Specifically, the fiber bundles 11 have a smaller coefficient of linear thermal expansion than the resin matrix 12 and therefore, a thermal stress is produced between the fiber bundles 11 and the resin matrix 12 due to the thermal hysteresis of the manufacturing process, thus creating the refractive index anisotropy due to a photoelastic effect.

If the refractive index anisotropy of the composite substrate 10 is measured on a microscopic area basis, the following results are obtained. It should be noted that the area-by-area refractive indices of the composite substrate 10 will be referred to herein as "microscopic area refractive indices", while the refractive index measured by a normal method will be referred to herein as a "macroscopic refractive index" or "average refractive index". Also, the refractive index anisotropy (birefringence) and retardation defined by the microscopic area refractive indices will be referred to herein as a "microscopic area refractive index anisotropy (or microscopic area birefringence)" and "microscopic area retardation", respectively.

Figure 2A:
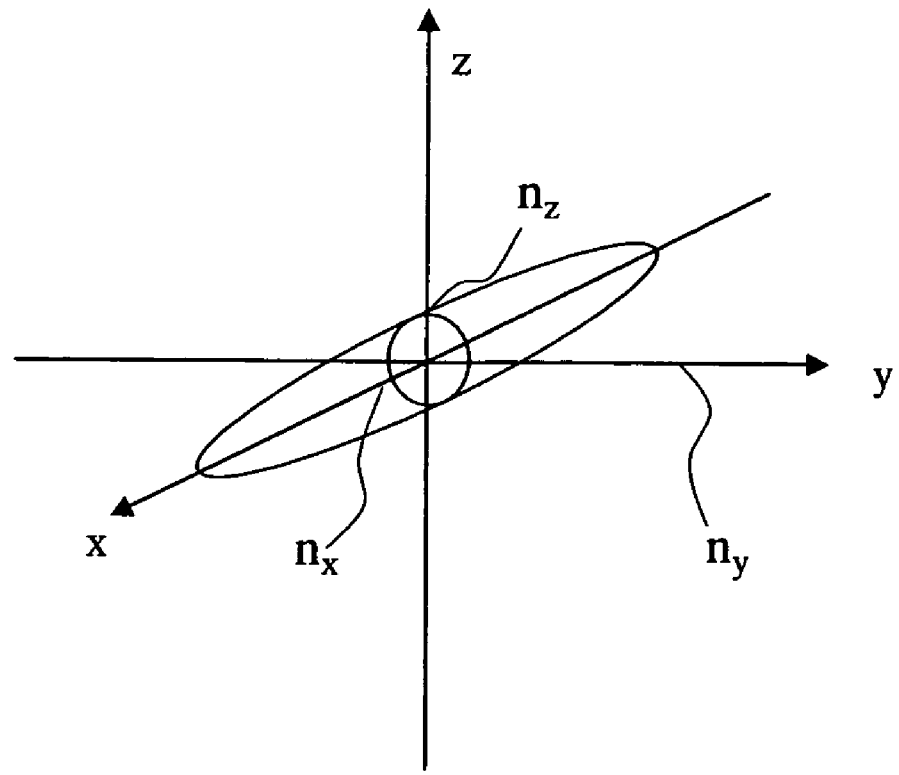
FIGS. 2A and 2B are schematic representations showing the refractive index anisotropy of a fiber-filled composite substrate.
Figure 2B:
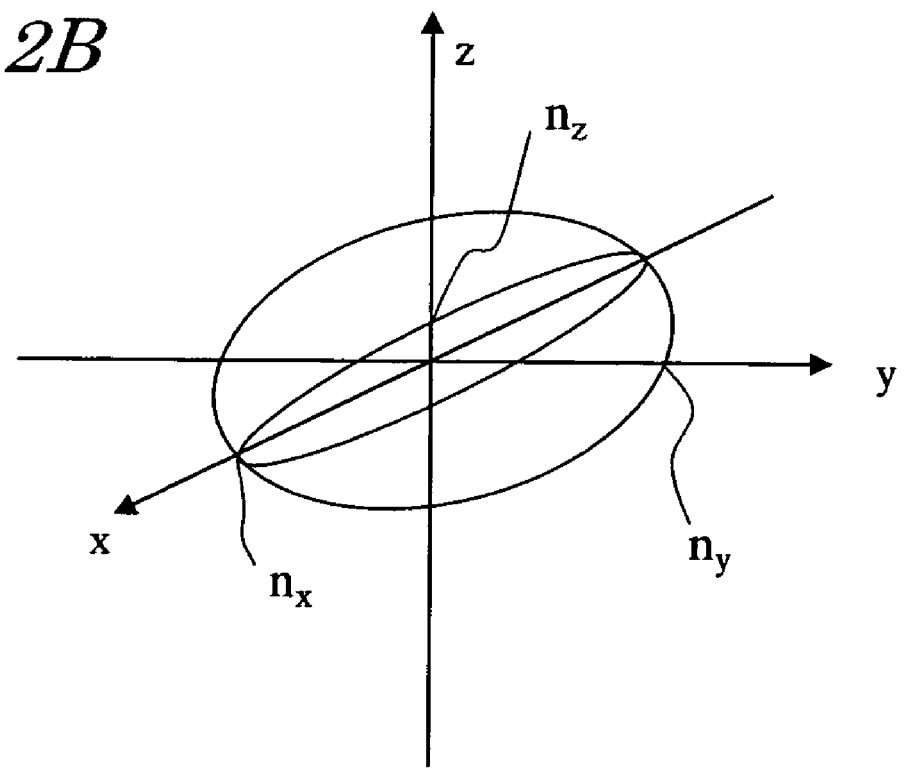

First, in each area 13 of the composite substrate 10, in which the fiber bundles 11 are aligned either only in the x-axis direction or in the y-axis direction, the refractive index $n_x$ (or $n_y$) of the fiber bundles 11 in their alignment direction has a greater microscopic area refractive index anisotropy as shown in FIG. 2A. On the other hand, each area 14, in which the fiber bundles 11 are aligned in two substantially perpendicular directions (i.e., the x-axis and y-axis directions), exhibits negative uniaxial microscopic area refractive index anisotropy ($n_x \fallingdotseq n_y > n_z$) as shown in FIG. 2B. Furthermore, each area 15 of the composite substrate 10, in which no fiber bundles 11 are present, exhibits an isotropic optical property (i.e., $n_x \fallingdotseq n_y \fallingdotseq n_z$).

Within the plane of the composite substrate 10, the areas 14 and 15 have no refractive index anisotropy (i.e., $n_x \fallingdotseq n_y$). Accordingly, the refractive index anisotropy as measured on the substrate plane by the conventional refractive index measuring method described above represents the average of the microscopic area refractive index anisotropies of the areas 13 and shows that the refractive index in the x-axis direction is not equivalent to that in the y-axis direction.

The macroscopic refractive index of the composite substrate 10 may be measured quantitatively by using an ellipsometer (e.g., ellipsometer M-220 produced by Jasco Inc.) with an Xe lamp light source (having a wavelength of about 400 nm to about 700 nm and a measuring area of about 10 mm ϕ) or an He—Ne laser light source (having a wavelength of about 632.8 nm and a measuring area of about 2 mm ϕ). It is difficult to measure the microscopic area refractive indices of the composite substrate 10 quantitatively. However, the microscopic area refractive index anisotropy described above may be confirmed qualitatively through polarizing microscopy.

If the composite substrate 10 having such unique optical anisotropy is used as the transparent substrate of a liquid crystal display device, then the following problems arise.

According to the conventional design as disclosed in Japanese Laid-Open Publication Nos. 59-33428 and 60-78420, the transmission axis and the rubbing direction of the polarizer need to be defined with respect to the optic axis of the composite substrate 10. More specifically, the transmission axis and rubbing direction of the polarizer (i.e., the pretilt direction of liquid crystal molecules) are substantially parallel to (or substantially perpendicular to) the direction in which the refractive index is the highest within a plane 6f the composite substrate 10. This is because special attention was paid to the macroscopic refractive index anisotropy of the plastic substrate 10 in the prior art.

If two polarizers are arranged as crossed nicols with the composite substrate 10 interposed between them such that the transmission axis of one of the two polarizers is substantially parallel to (or substantially perpendicular to) the direction in which the macroscopic refractive index of the composite substrate 10 becomes the highest, then leakage of light is observed due to the microscopic area refractive index anisotropies of the areas 13 in which the fiber bundles 11 are aligned in only the x-axis direction or in the y-axis direction (see FIG. 2A). This leakage of light should deteriorate the black display quality and decrease the contrast ratio (e.g., the front contrast ratio among other things) of the liquid crystal display device.

More importantly, if the microscopic area refractive index anisotropies are substantially averaged in the x-axis and y-axis directions, then even a composite substrate 10 having almost no macroscopic refractive index anisotropy (retardation) within its substrate plane will also have the microscopic area refractive index anisotropies, thus producing the leakage of light, too. That is to say, it is not true that "the relationship between the transmission axis of the polarizer and the optic axis of the composite substrate 10 may be arbitrarily defined as long as the in-plane retardation is 15 nm or less" as described in Japanese Laid-Open Publication No. 60-78420.

In a liquid crystal display device according to a preferred embodiment of the present invention, two substrates are arranged so as to sandwich a liquid crystal layer between them, and at least one of the two substrates that is located closer to the viewer includes a plastic substrate on which fiber bundles are aligned in two directions that intersect each other substantially at right angles. In addition, a polarizer which is located even closer to the viewer than the plastic substrate is, is arranged such that the transmission axis of the polarizer is substantially parallel to, or substantially perpendicular to, one of the two alignment directions. In the preferred embodiment described above, the plastic substrate includes the fiber bundles that are aligned in two directions that intersect each other substantially at right angles. However, even if a plastic substrate on which fiber bundles are aligned in only one direction (which will be referred to herein as a "first direction") is used, the polarizer to be provided closer to the viewer than the plastic substrate is may be arranged such that the transmission axis of the polarizer is substantially parallel to, or substantially perpendicular to, the first direction.

In this arrangement, if the plastic substrate has an in-plane-retardation (i.e., a macroscopic retardation), the direction in which the refractive index becomes the highest within the substrate plane is defined so as to form an angle of less than about 45 degrees with respect to the transmission axis of the polarizer. However, if at least the polarizer closer to the viewer is arranged such that the transmission axis of the polarizer is substantially parallel to, or substantially perpendicular to, the alignment direction of the fibers, then the leakage of light, resulting from the microscopic area refractive index anisotropies of the areas in which the fiber bundles 11 are aligned in just one direction, can be minimized or eliminated. This is because even if a linearly polarized light ray, which is polarized either substantially parallel or substantially perpendicular to the alignment direction of the fibers, passes the microscopic areas having such refractive index anisotropy that the refractive index becomes the highest in the alignment direction of the fibers, this linearly polarized light ray is not affected by the refractive index anisotropy at all as shown in FIG. 2A.

In order to reduce the in-plane retardation of the plastic substrate or to achieve isotropic mechanical properties, the plastic substrate preferably further includes multiple fibers that are aligned in a second direction intersecting with the first direction. More preferably, a plastic substrate, in which the first and second directions intersect with each other substantially at right angles as in the preferred embodiment described above, is used. If the first and second directions intersect with each other substantially at right angles, then the transmission axis of a polarizer, which is arranged substantially parallel to the first direction, is substantially perpendicular to the second direction. As a result, the leakage of light, resulting from the microscopic area refractive index anisotropies of the areas in which the fiber bundles are aligned in just one direction, can be minimized or eliminated effectively.

Naturally, the plastic substrate preferably has substantially no in-plane retardation (in-plane retardation of less than about 5 nm, for example). This condition can be achieved by adjusting the thickness of the fiber bundles that are aligned in two intersecting directions (as well as the thickness and number of the respective fibers included) and the pitch between two adjacent fiber bundles, for example.

By using a woven fabric in which substantially the same fiber bundles are aligned in two substantially perpendicular directions at the same pitch as in the preferred embodiment described above, the macroscopic in-plane retardation can be reduced to less than about 5 nm or even less than about 1 nm.

Hereinafter, a configuration for a liquid crystal display device according to a specific preferred embodiment of the present invention will be described in further detail.

FIG. 3 schematically illustrates a configuration for a transmissive liquid crystal display device 30 according to a preferred embodiment of the present invention. FIG. 4 schematically shows the arrangements of optic axes in the transmissive liquid crystal display device 30.

The transmissive liquid crystal display device 30 preferably includes two substrates 31 and 32, a liquid crystal layer 33 interposed between the two substrates 31 and 32, and two polarizers 34 and 35, which are arranged so as to sandwich the two substrates 31 and 32 between them.

Each of two plastic substrates used as the substrates 31 and 32 includes fiber bundles that are aligned in two substantially perpendicular directions 36 as in the plastic substrate 10 shown in FIG. 1. For example, the substrate 31 may be a counter substrate including a counter electrode between its principal surface and the liquid crystal layer 33, while the substrate 32 may be an active-matrix substrate including transparent pixel electrodes, TFTs and other circuit components (none of which is shown) between its principal surface and the liquid crystal layer 33.

The two polarizers 34 and 35 are arranged as two crossed nicols such that the absorption axis 37 of the polarizer 34 and the absorption axis 38 of the polarizer 35 cross each other substantially at right angles. Also, from the viewer's point of view, the absorption axes 37 and 38 are preferably arranged so as to define a tilt angle of about 45 degrees. The fiber alignment directions 36 of the plastic substrates used as the substrates 31 and 32 are preferably either substantially parallel or substantially perpendicular to the absorption axes 37 and 38. The absorption axis of each polarizer and the transmission axis thereof cross each other substantially at right angles. Accordingly, the transmission axes of the polarizers 34 and 35 are also preferably either substantially parallel or substantially perpendicular to the fiber alignment directions 36.

The liquid crystal layer 33 is preferably a TN mode liquid crystal layer. The rubbing direction 39 of each alignment film (not shown) is preferably substantially parallel to the absorption axis of its associated polarizer that is provided on the same side of the liquid crystal layer 33. That is to say, the rubbing direction of the alignment film provided for the substrate 31 is substantially parallel to the absorption axis 37, while the rubbing direction of the alignment film provided for the substrate 32 is substantially parallel to the absorption axis 38. This liquid crystal display device 30 is designed so as to conduct a display operation in a normally white mode.

This liquid crystal display device 30 can minimize the leakage of light, which would otherwise be produced due to the microscopic area refractive index anisotropies described above, thereby displaying an image of quality. The reason is as follows. The leakage of light is produced due to a retardation that is parallel to the fiber alignment direction. However, one of the two absorption axes 37 and 38 is either substantially parallel to, or substantially perpendicular to, the fiber alignment direction in which that retardation is produced. Accordingly, the light that could leak is actually absorbed into the polarizer 34 or 35 and never contributes to the display operation. Consequently, the liquid crystal display device 30 can exhibit improved display quality in black display and can show a higher contrast ratio (e.g., higher front contrast ratio among other things).

Transparent resins as materials for the composite substrates as the substrates 31 and 32 may be normal transparent resins. Examples of preferred transparent resins include thermosetting resins such as epoxy resins, phenol resins, phenol-epoxy mixed resins and bismaleimide triazine mixed resins and thermoplastic resins such as polycarbonate, polyethersulfone and polyetherimide.

Examples of preferred transparent fibers include inorganic fibers such as E-glass, D-glass and S-glass and organic fibers such as aromatic polyamide and other resins. The transparent fibers are preferably used as fiber bundles and more preferably used as a woven fabric as described above.

In order to increase the mechanical strength of the composite substrates and degree of uniformity of the mechanical and optical properties thereof, the fibers are preferably aligned uniformly all over the plane, the diameter of each fiber and the width of each fiber bundle are preferably as small as possible, and the bundle-to-bundle pitch is also as narrow as possible. More specifically, each fiber preferably has a diameter of about 20 μm or less, more preferably about 10 μm or less, for example. Each fiber bundle 11 preferably has a width of about 200 μm or less, for example. In addition, the bundle-to-bundle pitch is preferably about 500 μm or less, for example.

The woven fabric is most preferably plane woven as described above. Alternatively, any other normal woven fabric such as a satin or twill woven fabric may be used. Or even a nonwoven fabric may also be used.

The transparency of the composite substrate is preferably as high as possible. Accordingly, to minimize the diffuse reflection of light from the interface between the fibers and the resin matrix and scattering of light by the fibers, the refractive indices of the fibers and resin matrix are preferably selected so as to be as close to each other as possible. Generally speaking, the resin matrix can be selected from a broader variety of materials than the fibers are. Also, the refractive index of the resin is preferably adjusted by changing the chemical property of the resin by some method. For example, if a substituent such as fluorine atoms is introduced into the resin skeleton, then the refractive index thereof can be decreased. On the other hand, if bromine atoms are introduced thereto, then the refractive index can be increased.

The composite substrate may be made by processing the fibers (i.e., fiber bundles or woven fabric) and resin matrix material by any of various known methods. For example, if a thermosetting resin is used, the composite substrate may be manufactured by a compressing, rolling, casting or transfer molding process. On the other hand, a thermoplastic resin may be molded into the shape of the composite substrate by a compressing, injection molding or extruding process.

Optionally, a protective coating (i.e., hard coating layer) may be additionally provided on the surface of the composite substrate. The protective coating may be made of either an organic material or an inorganic material. The protective coating is typically made of an inorganic material such as $SiO_2$ film with excellent heat resistance, barrier property (i.e., ability to shut out water or oxygen gas) and mechanical strength. A plastic substrate can be used effectively to transmit visible radiation. Thus, the protective coating also needs to transmit visible radiation. Also, to minimize the reflection from the interface between the composite substrate and the protective coating, the material of the protective coating preferably has a refractive index that is almost equal to that of the resin matrix of the composite substrate.

For example, a composite substrate, which is made up of a plane woven fabric obtained by weaving fiber bundles (each of which includes about 50 E-glass fibers with a diameter of about 10 μm and has a width of about 200 μm) substantially perpendicularly to each other at a pitch of about 500 μm and an epoxy resin as a resin matrix, may have a thickness of about 0.17 mm, an in-plane retardation of less than about 1 nm, and a retardation of about 20 nm in the thickness direction, and can be used effectively as a plastic substrate for the liquid crystal display device 30. These in-plane retardations may be measured by the spectroscopic ellipsometer M-220 produced by Jasco Inc., for example.

The liquid crystal display device 30 including this plastic substrate may have a front contrast ratio of about 1,000:1 or more, which is far higher than the front contrast ratio of 300:1 to be obtained by arranging the polarizer such that the absorption axis thereof defines an angle of about 45 degrees with respect to the alignment direction of the fiber bundles (i.e., the x-axis or y-axis direction).

To ameliorate the viewing angle dependence of the TN mode liquid crystal display device 30, the phase plate disclosed in Japanese Patent No. 2866540 issued to the applicant of the present application (which will be referred to herein as a "tilted phase plate") may be used. Hereinafter, it will be described with reference to FIG. 5 how to arrange the optic axis of the tilted phase plate 42 (i.e., a principal axis of the index ellipsoid). It should be noted that the index ellipsoid and its principal axes to be used in the following description are approximations obtained from actually measured ones.

Figure 5:
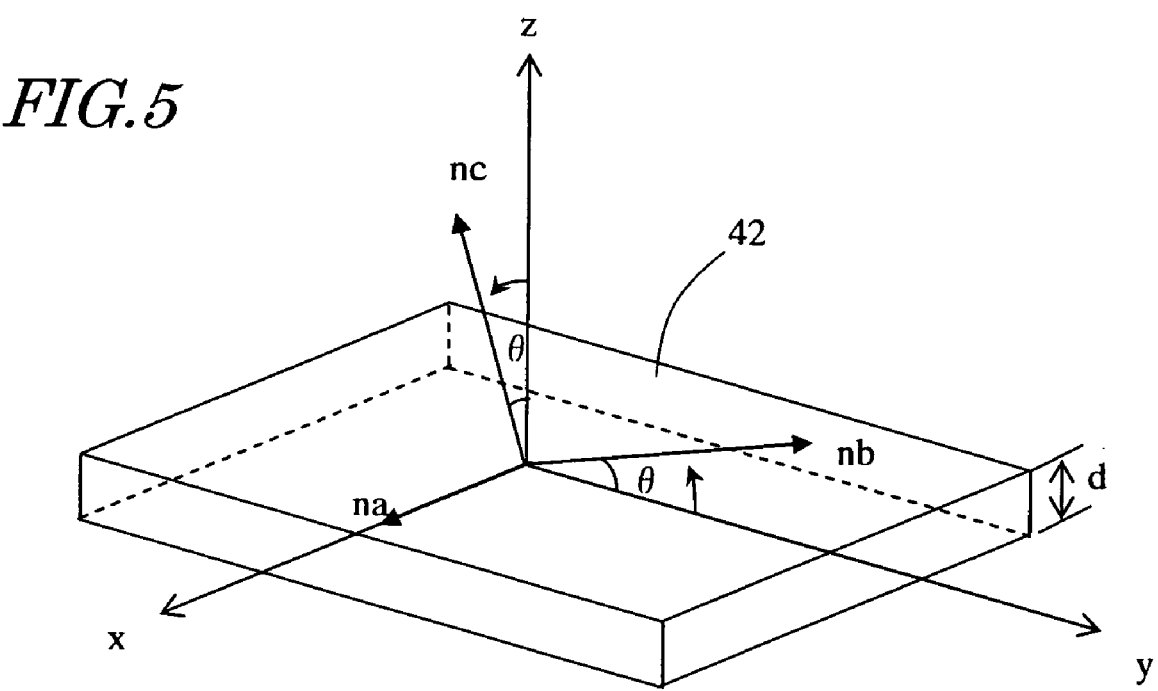
FIG. 5 schematically shows the refractive index anisotropy of a tilted phase plate for use in a liquid crystal display device according to a preferred embodiment of the present invention.

First, a right-handed perpendicular coordinate system x-y-z is defined for the tilted phase plate 42. More specifically, an x-y plane is substantially parallel to the principal surface of the phase plate 42 and a z-axis is substantially perpendicular to the principal surface of the phase plate 42. The three perpendicular principal axes of the phase plate 42 are supposed to be the a-axis, the b-axis and the c-axis and the refractive indices on the a-axis, b-axis and c-axis (i.e., principal refractive indices) are represented by na, nb and nc, respectively. Then, the inequality na=nb>nc is satisfied. That is to say, the phase plate 42 has negative uniaxial refractive index anisotropy. Furthermore, the a-axis is defined within a plane that is substantially parallel to principal surface of the phase plate 42 and is preferably substantially parallel to the x-axis. In a normal phase plate, the b-axis is substantially parallel to the y-axis and the c-axis is substantially parallel to the z-axis. In this phase plate 42, however, the b-axis tilts away from the y-axis and the c-axis tilts away from the z-axis as shown in FIG. 5. The b-axis and c-axis both have a tilt angle θ and both tilt clockwise with respect to the a-axis. Alternatively, the b-axis and c-axis may also tilt to the opposite directions from those shown in FIG. 5, i.e., counterclockwise with respect to the a-axis.

In the TN mode liquid crystal display device 30 shown in FIG. 3, the tilted phase plate 42 is provided between the substrate 31 and the polarizer 34 and/or between the substrate 32 and the polarizer 35. In this case, the tilted phase plate 42 is arranged such that the tilt direction 40 of the c-axis (with a principal refractive index nc, which is a refractive index in an anisotropic direction) is opposite to the rubbing direction 39 of the alignment film for the substrate 31.

The plastic substrates 31 and 32 of the liquid crystal display device 30 of this preferred embodiment have a macroscopic retardation $(nx-ny) \cdot d$ (where d is the thickness of the substrates) of substantially zero within the substrate plane but a macroscopic retardation (nx−nz)·d (where d is the thickness of the substrates) of a non-negligible value in the thickness direction. For example, if a fiber-filled composite substrate with a thickness of about 0.17 mm is used, the in-plane retardation Rp (which is a macroscopic retardation) is less than about 1 nm but the retardation Rth in the thickness direction is about 20 nm.

Accordingly, if the tilted phase plate 42 is arranged in the liquid crystal display device of this preferred embodiment, the retardation of the tilted phase plate 42 is preferably defined with the retardation of the plastic substrates in the thickness direction taken into account.

In the liquid crystal display device 30 described above, the liquid crystal layer 33 is a TN mode liquid crystal layer. Thus, the rubbing direction of each of the two alignment films is preferably substantially parallel to the absorption axis of its associated polarizer. On the other hand, in an IPS mode liquid crystal display device, for example, the rubbing directions (which are typically antiparallel) are defined so as to form an angle of approximately 10 degrees with respect to the transmission axis of one of the two polarizers that are arranged as crossed nicols. Even so, the polarizers are also preferably arranged such that the transmission axes thereof are either substantially parallel or substantially perpendicular to the alignment direction of the fiber bundles as in the TN mode liquid crystal display device 30 described above. In the IPS mode liquid crystal display device, the two alignment directions of the fiber bundles are preferably horizontal (width) and vertical (length) directions on the display plane.

In the preferred embodiment described above, the present invention is applied to a transmissive liquid crystal display device in which the two substrates, facing each other with the liquid crystal layer interposed between them, are both plastic substrates. Alternatively, only one of the two substrates may be the plastic substrate. Also, if the present invention is applied to a reflective liquid crystal display device, one of the two transparent substrates, which is located closer to the viewer, is preferably the plastic substrate. In that case, the plastic substrate is preferably arranged such that one of the two intersecting fiber alignment directions on the plastic substrate is either substantially parallel to, or substantially perpendicular to, the absorption axis of the polarizer provided closer to the viewer. Furthermore, in the reflective liquid crystal display device, the other substrate provided with a reflective layer does not have to be transparent but may still be the plastic substrate as well. This is because higher reliability would be achieved by using two substrates with substantially the same mechanical property (such as coefficient of linear thermal expansion).

In the preferred embodiment described above, the present invention is applied to a TN mode liquid crystal display device. However, a VA mode liquid crystal display device can be obtained by replacing the liquid crystal layer 33 of the transmissive liquid crystal display device 30 shown in FIG. 3 with a vertically aligned liquid crystal layer. The VA mode liquid crystal display device may have quite the same configuration as that shown in FIG. 3 except that its liquid crystal layer is a vertically aligned liquid crystal layer. Hereinafter, an exemplary configuration for such a VA mode liquid crystal display device will be described with reference to FIG. 3.

In the VA mode liquid crystal display device 30, the polarizers 34 and 35 are preferably arranged as crossed nicols such that the absorption axes 37 and 38 thereof cross each other at right angles. Also, the absorption axes 37 and 38 are arranged so as to form a tilt angle of about 45 degrees as viewed by the viewer. Furthermore, the plastic substrates as the substrates 31 and 32 are preferably arranged such that each of the two fiber alignment directions 36 is either substantially parallel or substantially perpendicular to the absorption axes 37 and 38.

The liquid crystal layer 33 includes a nematic liquid crystal material with negative dielectric anisotropy. A vertical alignment film is arranged on the surface of the substrates 31 and 32 so as to face the liquid crystal layer 33. While no voltage is being applied to the liquid crystal layer 33, the liquid crystal molecules are aligned substantially vertically to the inside surfaces of the substrates 31 and 32. However, when an electric field is applied to the liquid crystal layer 33, the liquid crystal molecules fall toward the direction that is substantially perpendicular to the electric field. The fall angle is determined by the intensity of the electric field applied. The orientations of the liquid crystal molecules are controlled such that the direction toward which the liquid crystal molecules fall (i.e., the direction parallel to the substrate plane) defines an angle of about 45 degrees with respect to the absorption axes 37 and 38 of the polarizers 34 and 35. This VA mode liquid crystal display device 30 conducts a display operation in normally black mode. To improve the viewing angle characteristic, the orientations of liquid crystal molecules are preferably controlled such that the liquid crystal molecules fall toward four directions, each pair of which is different from each other by 90 degrees, within each pixel. Such a control is sometimes called an "orientation division". Examples of known VA modes in which the orientations of liquid crystal molecules are controlled in this manner include MVA mode. Even when such an orientation division is carried out, the orientations of liquid crystal molecules are also controlled such that the direction toward which the liquid crystal molecules fall in each divided region (i.e., sub-pixel) defines an angle of about 45 degrees with respect to the absorption axes 37 and 38 of the polarizers 34 and 35.

This VA-mode liquid crystal display device 30 having such a configuration can also minimize the leakage of light, which would otherwise be produced due to the microscopic area refractive index anisotropies of the areas in which the fiber bundles are aligned in just one direction, thereby displaying an image of quality. The reason is as follows. The leakage of light is produced due to a retardation that is parallel to the fiber alignment direction. However, one of the two absorption axes 37 and 38 is either substantially parallel to, or substantially perpendicular to, the fiber alignment direction in which that retardation is produced. Accordingly, the light that could leak is actually absorbed into the polarizer 34 or 35 and never contributes to the display operation. Consequently, the liquid crystal display device 30 can exhibit improved display quality in black display and can show a higher contrast ratio (e.g., higher front contrast ratio among other things). The VA mode liquid crystal display device 30 including this plastic substrate may have a front contrast ratio of about 1,000:1 or more, which is far higher than the front contrast ratio of about 450:1 to be obtained by arranging the polarizer such that the absorption axis thereof defines an angle of about 45 degrees with respect to the alignment direction 36 of the fiber bundles.

According to various preferred embodiments of the present invention, the display quality of a liquid crystal display device including a fiber-filled plastic substrate can be greatly improved. Consequently, a liquid crystal display device according to a preferred embodiment of the present invention can be used effectively in a mobile telecommunications apparatus such as a cell phone or a PDA.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A liquid crystal display device comprising:
   a liquid crystal layer;
   a first substrate defining a first plane that is located closer to a viewer than the liquid crystal layer is;
   a second substrate arranged so as to face the first substrate with the liquid crystal layer interposed between the first and second substrates; and
   a first polarizer having a principal surface defining a second plane that is located even closer to the viewer than the first substrate is; wherein
   the first substrate includes a first plastic substrate in which a length of a plurality of fibers is aligned in a first direction of the first plane,
   the first polarizer is aligned such that the first plane and the second plane are substantially parallel and the transmission axis of the first polarizer is either substantially parallel to, or substantially perpendicular to, the first direction.

2. The liquid crystal display device of claim 1, wherein the first plastic substrate further includes another plurality of fibers that are aligned in a second direction intersecting with the first direction.

3. The liquid crystal display device of claim 2, wherein the first and second directions intersect with each other substantially at right angles.

4. The liquid crystal display device of claim 1, wherein the first plastic substrate has an in-plane retardation and is arranged such that a direction in which the refractive index thereof becomes the highest within a plane of the substrate defines an angle of less than about 45 degrees with respect to the transmission axis of the first polarizer.

5. The liquid crystal display device of claim 1, wherein the first plastic substrate has no in-plane retardations.

6. The liquid crystal display device of claim 1, wherein a first alignment film which is subjected to a rubbing treatment, is arranged on the first substrate so as to face the liquid crystal layer, and the rubbing direction of the first alignment film is arranged so as to be either substantially parallel to, or substantially perpendicular to, the first direction.

7. The liquid crystal display device of claim 1, wherein the liquid crystal layer is a TN liquid crystal layer, and
   wherein the device further includes:
   a second polarizer arranged on the second substrate such that the second substrate is sandwiched between the liquid crystal layer and the second polarizer; and
   at least one phase plate located at least one of between the first substrate and the first polarizer and between the second substrate and the second polarizer; wherein
   the first and second polarizers are arranged such that the transmission axes thereof are either substantially perpendicular to, or substantially parallel to, each other, and
   if the index ellipsoid of the at least one phase plate has an a-axis, a b-axis and a c-axis as principal axes that cross each other at right angles and if principal refractive indices on the a-axis, the b-axis and the c-axis are na, nb and nc, respectively, then na=nb>nc is satisfied, the a-axis is located within the plane of the at least one phase plate, and the c-axis defines a tilt angle Θ within a bc plane with respect to a line that is perpendicular to the phase plate; and
   the at least one phase plate is arranged such that the c-axis thereof is substantially perpendicular to the transmission axis of the first or second polarizer that is provided on the same side of the liquid crystal layer as the at least one phase plate.

* * * * *

UNITED STATES PATENT AND TRADEMARK OFFICE
CERTIFICATE OF CORRECTION

| | | |
|---|---|---|
| PATENT NO. | : 7,242,453 B2 | Page 1 of 1 |
| APPLICATION NO. | : 10/784617 | |
| DATED | : July 10, 2007 | |
| INVENTOR(S) | : Shinsuke Saida et al. | |

It is certified that error appears in the above-identified patent and that said Letters Patent is hereby corrected as shown below:

Title Page; item (54);
Title of the Invention should appear as follows:

Liquid Crystal Display Device Having a Plastic Substrate with a Plurality of Fibers Signed and Sealed this Thirtieth Day of October, 2007

JON W. DUDAS
*Director of the United States Patent and Trademark Office*